United States Patent [19]

Schurman, Jr. et al.

[11] 3,990,622

[45] Nov. 9, 1976

[54] APPARATUS FOR SOLDERING

[76] Inventors: David B. Schurman, Jr., 25 Rhodes Circle, Hingham, Mass. 02043; Jon Leask, 35 Harbourview St., Squantum, Mass. 02171

[22] Filed: May 9, 1974

[21] Appl. No.: 468,585

[52] U.S. Cl. .................................. 228/53; 228/52; 228/41
[51] Int. Cl.² .................... B23K 3/02; B23K 3/06
[58] Field of Search .................. 29/499; 219/229; 228/41, 51, 52, 53

[56] References Cited
UNITED STATES PATENTS

| | | | |
|---|---|---|---|
| 2,280,879 | 4/1942 | Anderson | 228/53 |
| 2,296,158 | 9/1942 | Gardner | 228/41 |
| 2,324,973 | 7/1943 | Young | 228/41 |
| 3,068,823 | 12/1962 | Nyborg | 219/229 X |
| 3,211,355 | 10/1965 | Zottai | 228/52 |
| 3,652,819 | 3/1972 | Kerr et al. | 228/41 X |
| 3,796,856 | 3/1974 | Wei-Cheng | 228/53 X |
| 3,797,725 | 3/1974 | Mori et al. | 228/41 |

*Primary Examiner*—Ronald J. Shore
*Attorney, Agent, or Firm*—Cushman, Darby & Cushman

[57] ABSTRACT

Soldering method and apparatus comprising a soldering device having a hand grip portion and an electrically heated soldering element extending from said hand grip portion and terminating in a soldering tip, a housing structure adapted to be supported in a position disposed in spaced relation from the solder device, the housing structure supporting a solder wire supply spool to be unwound therefrom, a tubing structure extending from the housing structure and connected with the soldering device for closely peripherally confining a leading portion of solder wire of substantial longitudinal extent extending from the spool with the free end thereof adjacent the soldering tip and for maintaining such confinement during longitudinal movement thereof in a direction wherein the free end engages the soldering tip while enabling the soldering device to be substantially freely manually moved in spaced relation relative to the housing structure by an operator grasping the hand grip portion thereof, the tubing structure including an elongated flexible tubing section extending from the housing structure and a relatively short rigid tubing section extending from the flexible tubing section, a mounting structure detachably mounting the rigid tubing section on the soldering device for disposition in an operative position wherein the free end thereof is disposed adjacent the tip, a knurled drive wheel carried by the housing structure for engaging the periphery of the leading portion of the solder wire at a position forwardly of the spool and effecting longitudinal movement of the leading portion of the solder wire, an electric gear motor carried by the housing structure in operative association with drive wheel, and an operator controlled foot switch for energizing the motor.

9 Claims, 3 Drawing Figures

APPARATUS FOR SOLDERING

This invention relates to soldering and more particularly to an improved apparatus for and method of soldering.

Soldering devices which are heated electrically have been commercially available for many years. Such devices have taken many forms over the years but they may be classified as belonging within one of two general types; namely, gun or pistol grip devices and pencil devices. In general it can be stated that the pencil type devices are used more in situations where extensive long term usage is undertaken, as in assembly line production of electronic components or the like; whereas the pistol grip types are used more in situations where occasional usage is contemplated, as in the repair of equipment in the workshop or in the home or the like.

The pencil type soldering devices are particularly useful in industrial production because of their light weight and small size. These characteristics are desirable because of the fact that the operator is often lifting and manually manipulating the soldering device throughout an eight-hour work shift so that the heavier weight of a pistol grip type soldering device might well materially contribute to operator fatigue as can the space difficulties involved in the larger sized pistol grip type devices where the work is of miniaturized size, as is so often the case.

Another factor which can materially contribute to worker inefficiency and fatigue under these conditions is the necessity of the worker to manually manipulate the solder wire separately from the soldering device. This requirement makes it physically impractical for the operator to conveniently manually manipulate the soldering device, the solder wire and the parts to be soldered.

It is well known in the soldering art that it would be much more efficient and less fatiguing for an operator to have the capability of handling the soldering device and the solder wire with one hand so that the other hand would be available to handle one of the parts being soldered. Numerous patents have issued disclosing solder wire feeding attachments for soldering devices. Despite the theoretical advantages which such devices are known to possess, at the present time there is no appreciable practical utilization of known solder wire feeding attachments with pencil type soldering devices under industrial applications where such attachments would be expected to secure the greatest possible advantages. It must be concluded that the practical disadvantages of known solder wire feeding attachments when applied under these more exacting circumstances outweigh the potential advantages. The overwhelming majority of the solder feed attachments disclosed in the patented literature are structured to be mounted entirely on the soldering device itself (see for example, U.S. Pat. Nos. 1,871,009, 2,871,333 & 3,521,804). When it is considered that the attachment itself must include some means to support a supply spool of solder, some means to guide a leading portion of the solder wire from the spool to the tip of the soldering device and some means to effect the feeding movement of the solder wire, it becomes readily apparent that the total weight and size of the structure which must be handled by the operator is so increased as to present severe disadvantages which outweigh the potential advantages.

The support of the solder wire supply presents a particularly vexing problem where the soldering device is being used on a production line basis. Under these circumstances a relative large amount of solder wire is used on a per-unit time basis. It is quite obvious that a large supply cannot be mounted on the soldering device itself because of the added weight which would have to be borne by the operator's hand. As the size of the supply is reduced to reduce weight, the inconvenience of supply replenishment is increased.

It has been proposed to support the supply spool independently of and in spaced relation to the soldering device and to extend the leading portion of the solder wire from the independently-supported spool to the solder feeding attachment carried by the soldering device. See, for example, U.S. Pat. No. 3,211,355. With such an arrangement a helical spring guide is provided which extends from the attachment to provide a measure of control to the solder wire extending from the spool to the attachment. Even so, the attachment itself, as disclosed in the aforesaid patent, includes the feeding mechanism as well as the guide structure to direct the wire onto the soldering tip. Mounting the feeding mechanism on the soldering device likewise presents problems and limitations. First, in order to reduce weight the feeding mechanism must be reduced to the simplest possible structure. Thus, in the aforesaid patent, the feeding mechanism consists essentially of a simple pivotally mounted knurled wheel. If one assumes a supply spool of 5 pounds, which would be desirable under production line capacities to reduce the inconvenience of supply replenishment (including set-up time, etc.), then it can be seen that the manual force required to effect a feeding movement would be considerable with a new supply especially when it is considered that the feeding movement is utilized to smooth out any kinks developing in the uncontrolled portion of the wire by movement through the helical spring section.

It is an object of the present invention to overcome the practical disadvantages noted above so as to make it possible to practically utilize the potential advantages of one-hand manipulation of both the soldering device and the solder wire. In accordance with the principles of the present invention this objective is obtained by providing a soldering apparatus in which a conventional industrial production line type soldering device is combined with a rigid solder wire guide tube suitably mounted thereon and with a separate housing structure independently supported in spaced relation to the soldering device, the housing structure having means for rotatably supporting a relatively large production capacity solder wire supply spool (e.g. 5 lbs.), power operated means for feeding a relatively extensive leading portion of solder wire from the spool to the rigid guide tube on the soldering device and a flexible elongated tubing structure extending from the feeding mechanism of the housing structure to the rigid guide tube of the soldering device. In terms of the procedural steps of the present method, the small size soldering wire is handled in cooperative conjunction with the heated tip of the soldering device to accomplish the soldering operation by applying a force to the periphery of the solder wire at a position remote from the free end thereof, which force is applied through surface deformation of the wire in a direction of movement toward the free end to thereby place the section of the wire between the free end and the remote position of force application in longitudinal compression and simultaneously closely peripherally confining substantially the entire compressed section of the solder wire in a manner permitting flexure thereof without buckling or snagging except a portion adjacent the free end which is closely peripherally confined in a rigid manner to move along a curved path having a fixed relationship with the manually supported heated tip such that the free end of the wire is directed onto the tip and melted to flow onto the work being soldered.

The construction and configuration of the flexible tubing structure and the procedural steps performed thereby are particularly advantageous principles of the apparatus and method of the present invention in that these principles make it possible to achieve the conveniences of one-hand manipulation of the soldering tip and solder wire throughout a wide range of soldering wire sizes (e.g. 0.009 inch to 0.125 inch and higher). The handling of the lower sizes of the range present peculiar problems which are neither contemplated nor practically solved in the prior art. These problems arise as a result of the extreme susceptibility of small size solder wire to shape and surface deformation and the necessity in accordance with the principles of the present invention to control deformation of shape of a long section of solder wire, which is under compressive loading and has surface deformation, in such a way to permit the wire to deform in response to manual movements without providing excessive drag or fatiguing resistance to such manual movement.

It is known in the arc welding art that a relatively hard surface and relatively stiff arc welding rod can be fed by remote motorized feed rollers through a coil spring guide to the work area. See, for example, U.S. Pat. No. 1,644,237. The existance of these teachings in the arc welding art does not suggest the principles of the present invention nor would the arc rod handling teachings of this patent be applicable to the solder wire handling problems herein contemplated. It will be noted that with a hard surface rod appreciable feeding force can be applied to the periphery of the rod without causing surface deformation. Thus the feeding force can be applied by a squeezing action and transmitted through frictional surface-to-surface contact. With a highly deformable material such as solder any localized squeezing action simply results in surface deformation. Consequently, feeding cannot be effectively accomplished without surface deformation and hence the best mode of feeding is one which minimizes and controls the amount of surface deformation. The necessity to deform the surface of the solder wire at the remote position of feed complicates the handling of the section of wire being fed. Such handling can not be effectively accomplished by flexible cable in the manner of a conventional bowden wire. A helical spring does not provide a continuous cylindrical confinement surface but rather a helical line confinement. The extreme susceptibility of a small size solder wire to shape deformation under a longitudinally applied compression load coupled with the surface deformations of the wire render the helical wire teachings of the prior art inapplicable to the smaller sizes of solder wire. The likelihood of the solder wire to simply plug up the spring through compression deformation is greatest where its longitudinal direction changes the most and it is at precisely this point that the spreading of the spring convolutes provide the greatest space permitting such deformation.

In accordance with the principles of the present invention these deficiencies are overcome by providing continuously close peripheral confinement of the solder wire periphery by a continuous anti-friction surface which permits the necessary manual movement without altering the effectiveness of the confinement. In a preferred embodiment, the anti-friction confinement surface is provided by an inner tube of polytetrafluoroethylene having an outer tube of polyvinyl chloride formed thereover to provide a desired elasticity to the tubing structure which prevents deformation of the inner tube to a point of permanent set.

In the light of the principles enunciated above, it becomes necessary to provide a tubing structure which is sized for a particular size solder wire. To accommodate different size solder wires, the motorized housing and remote control is formed as a unit capable of detachably receiving any one of a number of tubing structures of different size each of which is unitized with a feed mechanism and rigid tube of comparable size.

Accordingly, it is an object of the present invention to provide a soldering apparatus embodying the principles enunciated above.

These and other objects of the present invention will become more apparent during the course of the following detailed description and appended claims.

The invention may best be understood with reference to the accompanying drawings wherein an illustrative embodiment is shown.

Figure 1:
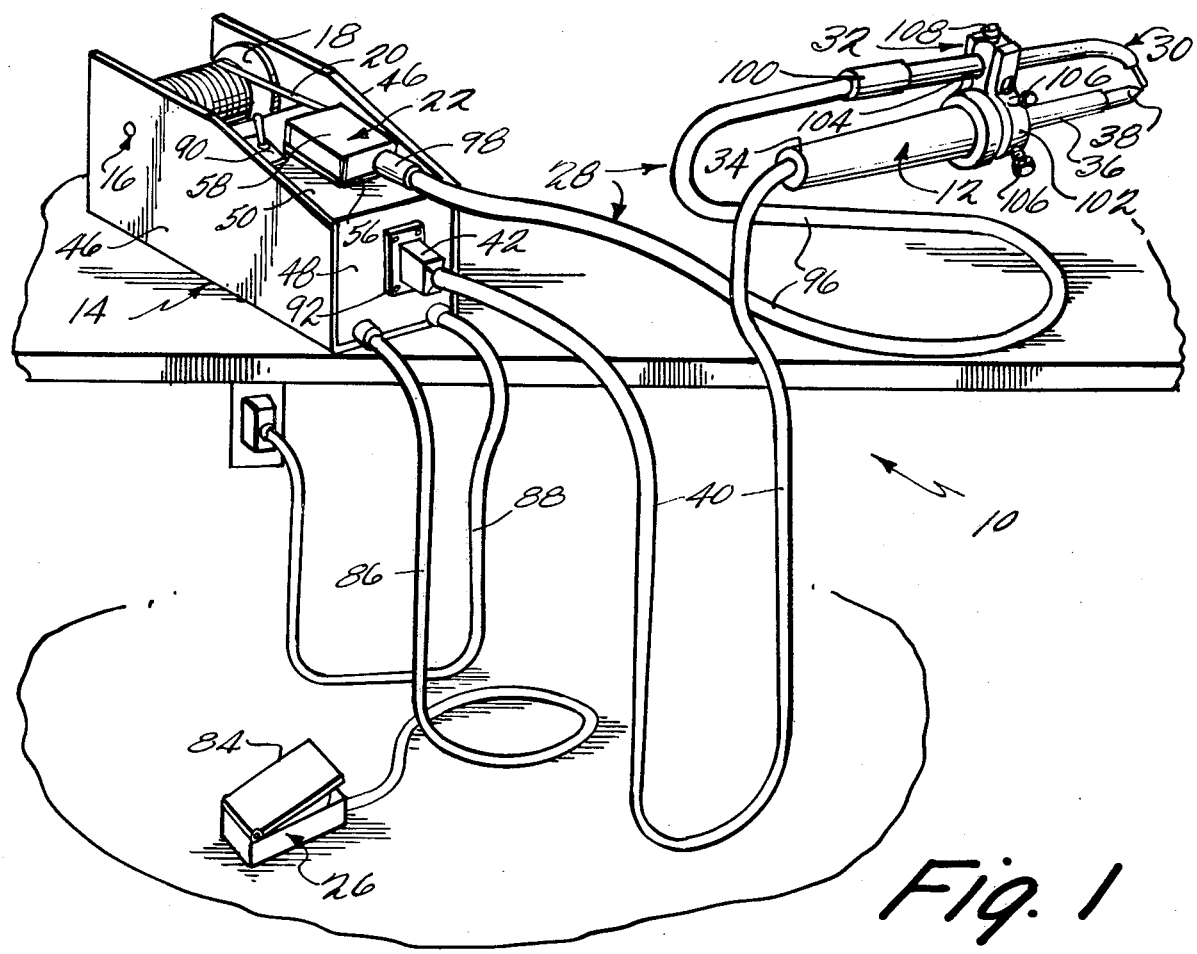
FIG. 1 is a perspective view of an apparatus embodying the principles of the present invention.

Referring now more particularly to the drawings there is shown therein a soldering apparatus, generally indicated at 10, which embodies the principles of the present invention. The apparatus 10 includes an electric soldering device 12 and a separate housing structure 14 arranged to be independently supported at a position remote from the soldering device 12. The housing structure 14 includes solder wire supply support means, generally indicated at 16, for rotatably supporting a supply spool 18 around which a supply of solder wire 20 is wound, the support being such that the spool will rotate about its axis to permit the solder wire to be unwound from the spool as needed. Detachably mounted on the housing structure 14 is a movable solder wire drive unit, generally indicated at 22, for applying drive forces to the periphery of the solder wire 20 extending from the spool at a position remote from the free end thereof. The drive unit 22 is driven by a power unit, generally indicated at 24, suitably carried by the housing structure 14 and detachably drivingly connected with the drive unit 22. A manual control unit, generally indicated at 26, is provided for operatively connecting the power unit 24 with the drive unit 22 to move the latter so that the feed of solder wire is within the manual control of the operator.

Extending from the housing structure 14 to the soldering device 12 is a flexible tubing structure 28 for controlling the feeding movements of the solder wire 20 between the drive unit 22 and remotely positioned soldering device 12 while permitting substantially unencumbered manual movement of the latter. The flexible tubing structure 28 leads to a rigid tubing section 30 and a mounting structure 32 is provided for detachably fixedly mounting the rigid tubing section 30 on the soldering device.

It will be understood that the soldering device 12 may be of any known construction, but that the invention has particular applicability to the pencil type devices commonly used in production lines and the like. Consequently, the device 12, as shown in the drawings, is preferably of this type and includes the usual hand grip portion 34 from which extends an electrical heating structure 36 and a terminal soldering tip 38. An electrical core 40 is provided for energizing the heating structure one-end of which is suitably connected with the heating structure and extends outwardly through the hand grip portion 34. The core 40 terminates in a convention plug 42.

Figure 2:
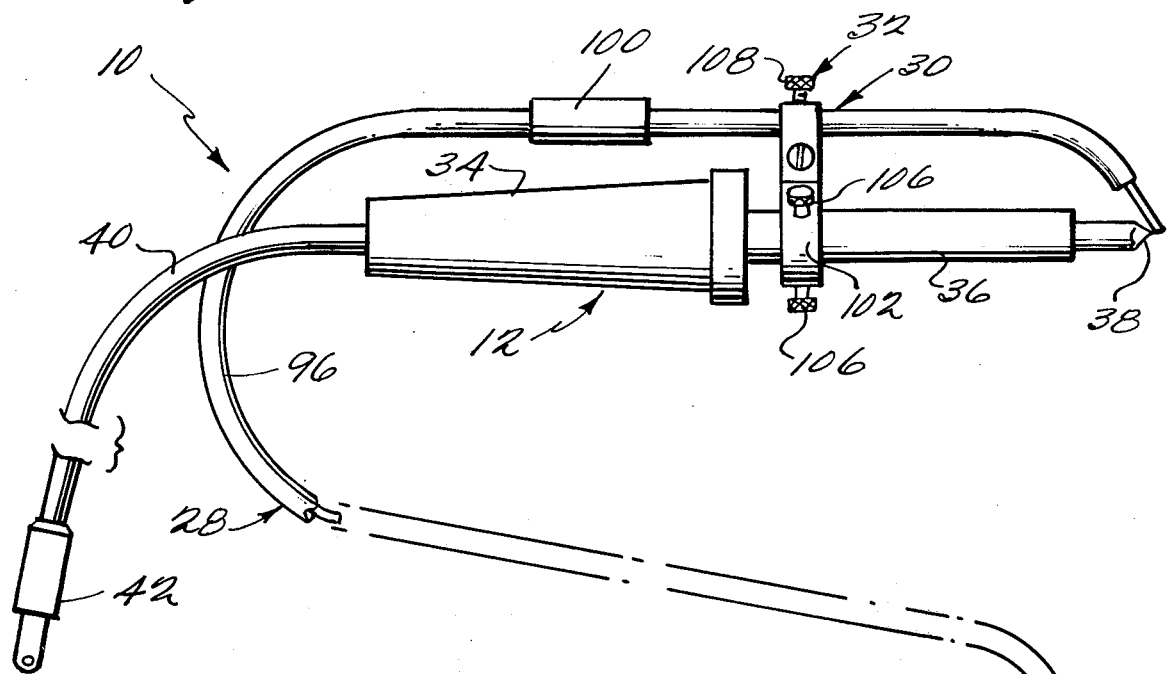
FIG. 2 is a side elevational view of the apparatus with certain parts broken away for purposes of clearer illustration.
Figure 2:
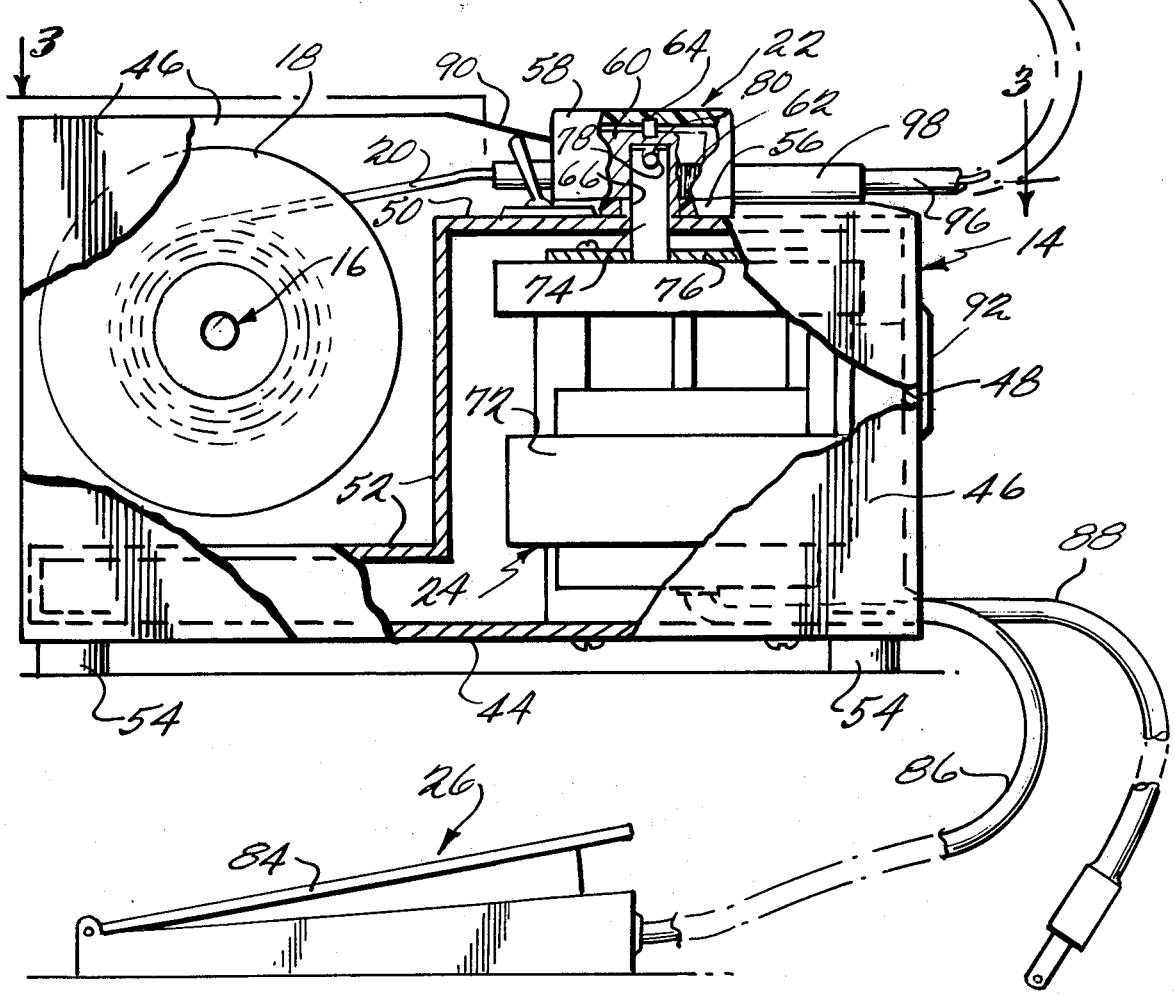

The housing structure 14 may assume any desired design and configuration. The preferred embodiment shown is exemplary of a simple and economical construction which includes a main support frame member formed of sheet metal and bent into a generally U-shaped configuration to provide a bottom wall portion 44 and two side wall portions 46. As best shown in FIG. 2, the solder wire supply spool 18 is preferably positioned between the upper rear sections of the side wall portions 46, the spool support means 16 being shown as a spindle assembly mounted within suitable apertures in the side wall portions 46. It will be understood, however, that the spool-support means may be of any desired construction.

The housing structure 14 also includes a main cover frame member which also is preferably formed of sheet metal bent to provide a front wall portion 48, a top wall portion 50 and a stepped rear wall portion 52. The cover frame member is detachably fixedly secured to the main support frame member by any suitable means, as, for example, fasteners (not shown) extending through support pads 54 through the bottom wall portion 44 and attaching flanges or the like formed in the cover member.

Figure 3:
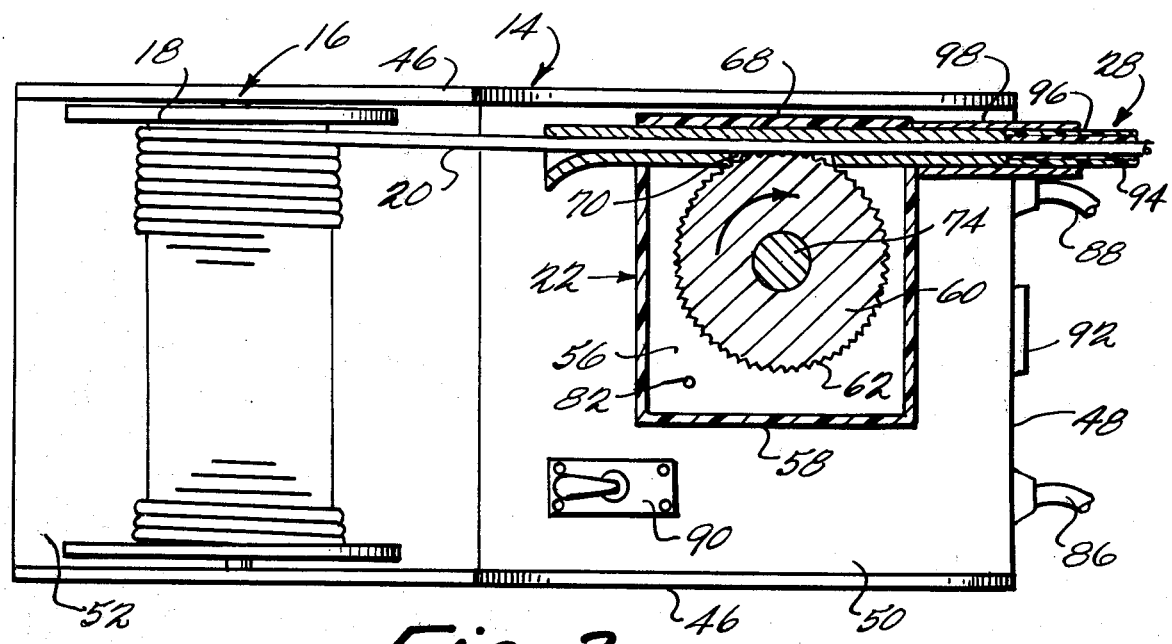
FIG. 3 is an enlarged, fragmentary sectional view taken along the line 3—3 of FIG. 2.

The drive unit 22 preferably includes its own housing separate from the main frame provided by the housing structure 14 and adapted to be detachably supported thereon. As shown, the drive unit housing is of two-piece construction preferably molded of a suitable plastic material to include a generally rectangularly-shaped base member 56 and a generally inverted cup-shaped cover member 58. Rotatably mounted within the housing members 56 and 58 is a solder wire drive wheel 60 having a knurled lower periphery 62 as best shown in FIGS. 2 and 3. The upper end of the drive wheel 60 is apertured to receive a stub shaft 64 carried by the cover member 58 and the base member 56 is apertured to receive a hub 66 formed on the lower end of the wheel.

Extending horizontally through the cover member 58 in cooperating relation with the knurled periphery 62 of the drive wheel 60 is a solder wire guide means in the form of a tubular member 68 which may be constructed of any suitable material. Metal may be used for wear characteristics, although a plastic material may be desirable for antifriction characteristics.

The rear end of the tubular member is flared to receive the solder wire 20 therein and the central portion of the tubular member is cut away, as indicated at 70 in FIG. 3, along a side portion adjacent the periphery of the drive wheel to expose the periphery of the solder wire 20 to the knurled periphery 62 of the drive wheel. While the solder wire guide means is preferably of tubular construction in order to provide better guiding control of the solder wire, it will be understood that a cooperating wheel could be utilized to maintain the solder wire in contact with the knurled periphery of the drive wheel.

The power unit 24, as best shown in FIG. 3, is preferably in the form of a commercially-available electric gear motor 72 having an output shaft 74 which rotates at approximately 7 RPM when the motor is energized. As shown, the gear motor is mounted on the bottom wall portion 44 of the support frame member by a suitable inverted U-shaped flanged bracket 76 so that the output shaft extends upwardly. The top wall portion 50 of the cover member is suitably apertured to receive the shaft 74 therethrough. The upwardly extending end portion of the shaft is adapted to be detachably drivingly connected with the drive wheel 60 of the drive unit 22 and, to this end, a slot 78 is formed in the end of the shaft 74. The lower end portion of the drive wheel 60 is formed with an axial bore for receiving the shaft 74 and has a pin 80 mounted radially therein to extend across the bore and engage within the slot 78 when the unit 22 is moved downwardly into supported relation with the top housing wall 50. To facilitate the detachable connection of the drive unit 22 to the power unit 24, the base member 56 of the housing of the unit 22 is apertured to receive one or more guide pins 82 (see FIG. 3) extending upwardly from the top wall 50 of the housing structure 14.

The manual control unit 26 is preferably in the form of a conventional foot switch assembly 84 electrically connected to control the energization of the gear motor 72. This arrangement is preferred because of its simplicity, although it will be understood that other types of control units may be employed including mechanical controls such as clutches, etc. A foot actuated switch is preferred rather than a trigger switch on the soldering device 12 because it is less encumbering to the soldering device. The foot switch readily lends itself to remote manual actuation by simply providing an electrical cord 86 extending therefrom to the housing structure 14. As shown, the housing structure 14 also has a main power cord 88 extending therefrom as well as a main power on-off switch 90 mounted on top wall 50 and an outlet socket 92 mounted on the front wall 48. It will be understood that with this arrangement, switch 90 controls the main power circuit from line 88 through the socket 92 and the foot switch 84 in parallel. Thus, by engaging the soldering device cord plug 42 within the socket 92, the heating structure 36 of the soldering device is continuously energized and the drive motor 72 can be energized as needed by the operator by actuating the foot switch 84. By moving switch 90 to the off position, both the drive motor and soldering device are shut off.

The flexible tubing structure 28 is an important aspect of the present invention since it provides for the controlled feeding movements of the solder wire in conjunction with the necessary unencumbered flexibility of movement of the soldering device 12. A preferred construction is to utilize an inner tubular member 94 of polytetrafluroethylene having an outer tubular member 96 of polyvinyl chloride mounted thereover. The interior peripheral surface of the inner tubular member, which closely peripherally confines the solder wire 20, is of a continuous cylindrical configuration and of antifrictional characteristics. The outer tubular member 96 provides a desirable elastic characteristic to the inner tube which prevents excessive flexure during handling which might cause the inner member to take a permanent set. If desired, a heat resistant outer tubular member such as braided asbestos or the like may be used as a safety measure to insure against heat damage. While the preferred material and construction is as indicated above, it will be understood that other materials and arrangements which provide similar functional characteristics may be employed. Close continuous peripheral confinement by an antifriction surface is particularly required for the smaller size solder wire, as, for example, 0.009 inch diameter solder wire. An exemplary diameter dimension of the cylindrical interior confining surface for such a small size solder wire is approximately 0.011 inch. For 0.031 inch solder wire, a 0.040 inch confinement surface is utilized. The clearance can be increased as the size of the solder wire and, hence, the rigidity thereof is increased. Continuous surface confinement is not essential with the larger size solder wires, such as 0.125 inches and up.

In the light of the above discussion, it is evident that a corresponding size flexible tubing structure must be provided for each different solder wire size. While the drive unit could be made adjustable to accommodate solder wires of different size, a much more reliable feeding action can be obtained without the provision of such adjustment. Accordingly, the drive unit 22 is preferably unitized with the flexible tubing structure 28 as by a fixed collar 98. Similarly, the flexible tubing structure 28 is unitized with a rigid tube 30 which is correspondingly sized, as by a collar 100. With this unitized arrangement, solder wires of different size can be accommodated by providing correspondingly different sized unitized assembles consisting of drive units, flexible tubing structures and rigid tubes.

The simplicity with which the drive unit of such a unitized assembly can be connected in driving relation to the shaft 74 of the power unit 24 and detached therefrom has already been described. The support structure 32 for detachably mounting the rigid tubing section 30 on the soldering device 12 is likewise constructed to facilitate ready connection and detachment.

First, it will be understood that the tubing section 30 is rigid so as to insure accurate direction of the free end of the solder wire issuing therefrom onto the soldering tip. Such rigidity is essential not only from the standpoint of the necessity to maintain a non-deformable curve in the cantilevered discharge end of the tube, but also from the standpoint of maintaining the entire tube in an accurately located predetermined operative discharge position on the soldering device. While it is contemplated that the rigid tube could be mounted for movement into such accurately located operative discharge position from a normal inoperative position, it is preferable to fixedly mount the rigid tube in its operative discharge position. Thus, a preferred construction material for the rigid tube is stainless steel. For the smaller sizes of solder wire, the inner tubular member of the flexible tubing structure may be extended within the stainless steel tube all of the way to the discharge end to insure continuity of the antifriction confinement surface. Moreover, it may be desirable to add material to the rigid tubing section adjacent the position of securement with the mounting structure 32.

The preferred mounting structure 32 as shown includes a strap 102 of metal bent into generally U-shaped configuration of a size allowing the heating structure 36 of the soldering device to pass through the light portion. Mounted between the legs of the strap is an apertured block 104 of heat insulating material, as, for example, polytetrafluroethylene. To accommodate variations in soldering devices, a plurality of bolts 106 are threaded through the light portion of the strap 102 so as to be tightened into engagement with the periphery of the heating structure 36 or other corresponding structure of the soldering device 12. Likewise, a bolt 108 is threaded into the block 104 to clamp rigid tubes therein which vary somewhat in size.

From the above, the manner in which the apparatus 10 is operable under the operator's control is evident.

It will be understood that the present invention includes a method of soldering with a soldering device having a hand grip portion and an electrically-heated soldering tip extending therefrom which comprises the steps of manually directing the heated soldering tip into operative relation with a workpiece to be soldered through engagement of the hand grip portion of the device with one hand, rotatably supporting a spool supply of solder wire at a position remote from the device so that the solder wire can be unwound therefrom, applying successive incremental surface deforming forces to the periphery of the wire extending from the supply spool at a position remote from the free end thereof so as to cause the wire to move longitudinally in a direction toward the free end thereof and to cause the section of solder wire extending from the position of force application to the free end thereof to be placed under longitudinal compression, closely peripherally confining a trailing portion of the aforesaid wire section under longitudinal compression extending from the position of force application to a position adjacent the soldering device while permitting said trailing portion to flex in response to movements applied thereto as by the manual movement of the soldering device, closely peripherally confining a leading portion of said solder wire section extending from said trailing portion to the free end thereof along a curved path fixed with respect to the soldering device which directs the free end of the solder wire onto the soldering tip while permitting said leading portion to be moved in response to the manual movement of said device but preventing flexure thereof out of said fixed path, melting by the heat of said soldering tip the free end of the solder wire moved onto said soldering tip, as aforesaid, and directing the melted solder wire onto the workpiece and allowing it to solidify.

As used herein, the feeding movement of the free end of the solder wire onto the soldering tip refers to a functional cooperation between the solder wire and soldering tip rather than any precise location. The precise location is adjustable and in many instances it may be considered desirable to feed the free end of the solder wire onto the work adjacent the tip or partly in contact with the tip and the work.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Soldering apparatus comprising the combination of
    a soldering device comprising a hand grip portion and an electrically heated soldering element extending from said hand grip portion and terminating in a soldering tip,
    a housing structure having means for supporting the same in a position disposed in spaced relation from said soldering device,
    means carried by said housing structure for supporting a solder wire supply spool for rotation about its axis so as to permit the solder wire to be unwound therefrom,
    means extending from said housing structure and connected with said soldering device for closely peripherally confining a leading portion of solder wire of substantial longitudinal extent extending from said spool with the free end thereof adjacent said soldering tip and for maintaining such confinement during longitudinal movement thereof in a direction wherein the free end engages said soldering tip while enabling the soldering device to be substantially freely manually moved in spaced relation relative to said housing structure by an operator grasping the hand grip portion thereof,
    said peripheral confining means including an elongated flexible tubing section extending from said housing structure and a relatively short rigid tubing section extending from said flexible tubing section,
    said flexible tubing section including a continuous cylindrical interior confinement surface formed of polytetrafluoroethylene,
    means mounting said rigid tubing section on said soldering device for disposition in an operative position wherein the free end thereof is disposed adjacent said tip so as to direct the free end of the leading portion of the solder wire on to said tip during longitudinal movement thereof in said peripherally confined relation,
    movable driving means carried by said housing structure for engaging the periphery of the leading portion of the solder wire at a position forwardly of said spool and effecting longitudinal movement of the leading portion of the solder wire in said closely peripherally confined relation in a direction to move the free end thereof onto said tip,
    power means carried by said housing structure in operative association with said movable means, and
    operator controlled means for effecting movement of said movable driving means by said power means.

2. Apparatus as defined in claim 1 wherein said power means comprises an electric gear motor.

3. Apparatus as defined in claim 2 wherein said movable driving means includes a knurled wheel drivingly connected with said electric gear motor.

4. Apparatus as defined in claim 3 wherein said operator controlled means includes a foot operated switch remote from said housing structure electrically connected to control the energization of said electric gear motor.

5. Apparatus for feeding a supply of solder wire wound around a spool to the top of a soldering device of the type comprising a hand grip portion and an elongated electrically heated soldering element extending from said hand grip portion and terminating in said soldering tip, said apparatus comprising
    a housing structure having means for supporting the same in a position disposed in spaced relation from the soldering device,
    means carried by said housing structure for supporting the solder wire supply spool for rotation about its axis so as to permit the solder wire to be unwound therefrom,
    means extending from said housing structure and adapted to be connected with the soldering device for continuously closely peripherally confining a leading portion of solder wire of substantial longitudinal extent extending from said spool with the free end thereof adjacent the soldering tip and for maintaining such confinement during longitudinal movement thereof in a direction wherein the free end engages the tip while enabling the soldering device to be substantially freely manually moved in spaced relation relative to said housing structure by an operator grasping the hand grip portion thereof,
    said peripheral confining means including an elongated flexible tubing section having a continuous cylindrical low-friction interior surface formed of polytetrafluroethylene extending from said housing structure and a relatively short rigid tubing section extending from said flexible tubing section,
    means for removably mounting said rigid tubing section on the soldering device for disposition in an operative position wherein the free end thereof is disposed adjacent said tip so as to direct the free end of the leading portion of the solder wire onto the tip during longitudinal movement thereof in said peripherally confined relation,
    a movable drive unit fixedly connected with said flexible tubing section and removably carried by said housing structure for engaging the periphery of the leading portion of the solder wire at a position forwardly of said spool and effecting longitudinal movement of the leading portion of the solder wire in said closely peripherally confined relation in a direction to move the free end thereof onto said tip,
    power means carried by said housing structure in operative association with said movable drive unit, and
    operator actuated means for effecting movement of said movable drive unit by said power means.

6. A unit for directing solder wire extending from a spool, rotatably supported in a frame structure having a remotely controlled motorized shaft rotatably supported therein, onto the tip of a remote manually operated soldering device, said unit comprising, a housing adapted to be detachably supported on said frame structure, a knurled drive wheel rotatably mounted in said housing having means for drivingly engaging said shaft when said housing is supported on said frame structure, solder wire guide means extending through said housing in cooperating relation with said knurled wheel, an elongated flexible tubing section having one end thereof fixedly connected with said wire guide means for closely peripherally confining solder wire extending through said wire guide means in cooperating relation to said knurled drive wheel to permit controlled longitudinal movement therethrough under longitudinal compression while permitting flexure thereof and a rigid tube adapted to be supported on the soldering device having one end fixed in communicating relation to the other end of said flexible tubing section for closely peripherally confining the solder wire along a fixed path, said flexible tubing section including a continuous cylindrical interior confinement surface formed of polytetrafluroethylene, said rigid tube including a curved free end portion adapted to be disposed in spaced relation to the soldering tip of a soldering device in a position to direct the free end of a solder wire issuing therefrom onto the soldering tip.

7. Soldering apparatus comprising the combination of
   a soldering device comprising a hand grip portion and an electrically heated soldering element extending from said hand grip portion and terminating in a soldering tip,
   a housing structure having means for supporting the same in a position disposed in spaced relation from said soldering device,
   means carried by said housing structure for supporting a solder wire supply spool for rotation about its axis so as to permit the solder wire to be unwound therefrom,
   means extending from said housing structure and connected with said soldering device for closely peripherally confining a leading portion of solder wire of substantial longitudinal extent extending from said spool with the free end thereof adjacent said soldering tip and for maintaining such confinement during longitudinal movement thereof in a direction wherein the free end engages said soldering tip while enabling the soldering device to be substantially freely manually moved in spaced relation relative to said housing structure by an operator grasping the hand grip portion thereof,
   said peripheral confining means including an elongated flexible tubing section extending from said housing structure and a relatively short rigid tubing section extending from said flexible tubing section,
   said flexible tubing section including inner tube of polytetrafluroethylene and an outer tube of polyvinyl chloride,
   means mounting said rigid tubing section on said soldering device for disposition in an operative position wherein the free end thereof is disposed adjacent said tip so as to direct the free end of the leading portion of the solder wire on to said tip during longitudinal movement thereof in said peripherally confined relation,
   movable driving means carried by said housing structure for engaging the periphery of the leading portion of the solder wire at a position forwardly of said spool and effecting longitudinal movement of the leading portion of the solder wire in said closely peripherally confined relation in a direction to move the free end thereof onto said tip,
   power means carried by said housing structure in operative association with said movable means, and
   operator controlled means for effecting movement of said movable driving means by said power means.

8. Apparatus for feeding a supply of solder wire wound around a spool to the tip of a soldering device of the type comprising a hand grip portion and an elongated electrically heated soldering element extending from said hand grip portion and terminating in said soldering tip, said apparatus comprising
   a housing structure having means for supporting the same in a position disposed in spaced relation from the soldering device,
   means carried by said housing structure for supporting the solder wire supply spool for rotation about its axis so as to permit the solder wire to be unwound therefrom,
   means extending from said housing structure and adapted to be connected with the soldering device for continuously closely peripherally confining a leading portion of solder wire of substantial longitudinal extent extending from said spool with the free end thereof adjacent the soldering tip and for maintaining such confinement during longitudinal movement thereof in a direction wherein the free end engages the tip while enabling the soldering device to be substantially freely manually moved in spaced relation relative to said housing structure by an operator grasping the hand grip portion thereof,
   said peripheral confining means including an elongated flexible tubing section having a continuous cylindrical lowfriction interior surface extending from said housing structure and a relatively short rigid tubing section extending from said flexible tubing section,
   said flexible tubing section including inner tube of polytetrafluroethylene and an outer tube of polyvinyl chloride,
   means for removably mounting said rigid tubing section on the soldering device for disposition in an operative position wherein the free end thereof is disposed adjacent said tip so as to direct the free end of the leading portion of the solder wire onto the tip during longitudinal movement thereof in said peripherally confined relation,
   a movable drive unit fixedly connected with said flexible tubing section and removably carried by said housing structure for engaging the periphery of the leading portion of the solder wire at a position forwardly of said spool and effecting longitudinal movement of the leading portion of the solder wire in said closely peripherally confined relation in a direction to move the free end thereof onto said tip,
   power means carried by said housing structure in operative association with said movable drive unit, and
   operator actuated means for effecting movement of said movable drive unit by said power means.

9. A unit for directing solder wire extending from a spool, rotatably supported in a frame structure having a remotely controlled motorized shaft rotatably supported therein, onto the tip of a remote manually operated soldering device, said unit comprising, a housing adapted to be detachably supported on said frame structure, a knurled drive wheel rotatably mounted in said housing having means for drivingly engaging said shaft when said housing is supported on said frame structure, solder wire guide means extending through said housing in cooperating relation with said knurled wheel, an elongated flexible tubing section having one end thereof fixedly connected with said wire guide means for closely peripherally confining solder wire extending through said wire guide means in cooperating relation to said knurled drive wheel to permit controlled longitudinal movement therethrough under longitudinal compression while permitting flexure thereof and a rigid tube adapted to be supported on the soldering device having one end fixed in communicating relation to the other end of said flexible tubing section for closely peripherally confining the solder wire along a fixed path, said flexible tubing section including inner tube of polytetrafluroethylene and an outer tube of polyvinyl chloride, said rigid tube including a curved free end portion adapted to be disposed in spaced relation to the soldering tip of a soldering device in a position to direct the free end of a solder wire issuing therefrom onto the soldering tip.

* * * * *